Aug. 3, 1954  S. H. GORDON ET AL  2,685,628
ELECTRIC RESISTANCE WELDING MACHINE
Filed March 28, 1952  3 Sheets-Sheet 1

Inventors
Samuel Hunter Gordon
Robert Fulton Johnstone
Charles Thomson
by Stevens, Davis, Miller & Mosher
their attorneys

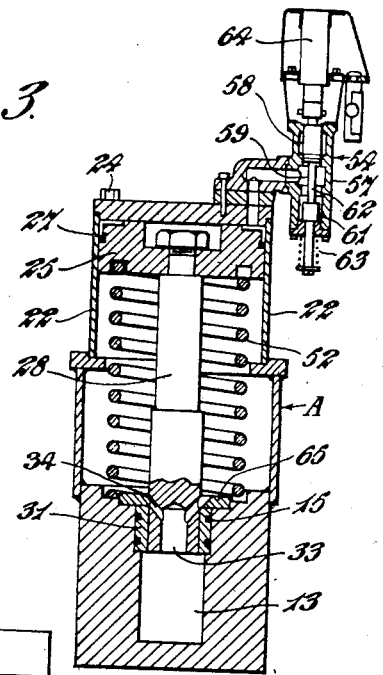
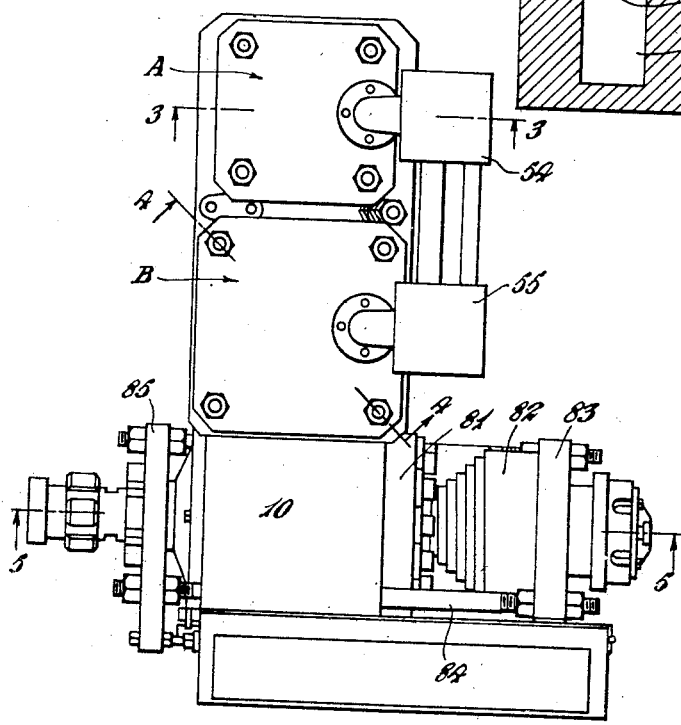

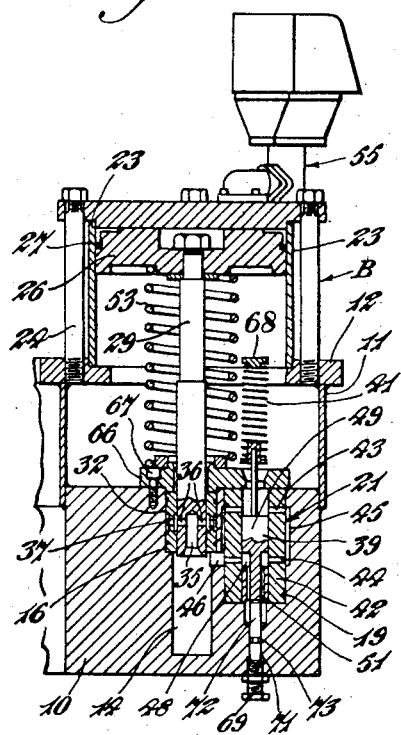

Patented Aug. 3, 1954

2,685,628

UNITED STATES PATENT OFFICE 2,685,628

ELECTRIC RESISTANCE WELDING MACHINE

Samuel Hunter Gordon, Charles Thomson, and Robert Fulton Johnstone, Inverness, Scotland, assignors to Resistance Welders Limited, Inverness, Scotland Application March 28, 1952, Serial No. 279,012

Claims priority, application Great Britain March 29, 1951

7 Claims. (Cl. 219—4)

This invention relates to automatic flash-butt resistance welding machines in which the feed movement of the moving head is effected by a feed system of the kind in which liquid pressure acts on a ram with which the head moves, the rate of movement of the said head during the flashing period being controlled by restricting the rate of flow of the liquid which acts on the said ram.

The invention is concerned with the feed system.

The term air-liquid pressure intensifier used herein refers to a device including a piston working in an air cylinder and a plunger of smaller area than the piston working in a liquid cylinder, the plunger being forced into the liquid cylinder by air pressure acting on the piston so as to create, in the liquid cylinder, a liquid pressure which is greater than the air pressure in the ratio of the areas of the piston and the plunger.

According to the present invention, in a feed system of the kind referred to for the moving head of an automatic flash-butt resistance welding machine liquid pressure for actuating the moving head is produced by a first pressure producing unit during the flashing period and by a second pressure producing unit during the butting period, a metering valve being interposed between the first pressure producing unit and the ram, and the said first pressure producing unit being isolated from the ram when the second pressure producing unit comes into operation.

A valve controlled by pressure produced by the first pressure producing unit is preferably provided to control connections between the ram cylinder and a reservoir and between the second pressure producing unit and the said reservoir, the said valve being closed when the first pressure producing unit comes into operation.

The liquid pressure producing units are preferably constituted by air-liquid pressure intensifiers.

The liquid cylinders of the said intensifiers may be formed by vertical bores, closed at their lower ends, in a metal block, the ram operating the moving head working in a horizontal bore in the same block, and the metal block conveniently forms the base of a reservoir for liquid, and the air cylinders of the air-liquid pressure intensifiers are mounted above the said reservoir.

The invention is hereinafter described with reference to the accompanying drawings, in which:

Figure 2 is a plan view of the main assembly of the feed system shown in Figure 1.

Figure 3 is a vertical section on the line 3—3 of Figure 2.

Figure 4 is a vertical section on the line 4—4 of Figure 2.

Figure 5 is a vertical section on the line 5—5 of Figure 2.

Figure 6 is a diagram showing the electrical connections of welding machine having a feed system according to the invention, and arranged for simple flash-butt resistance welding.

Figure 1:
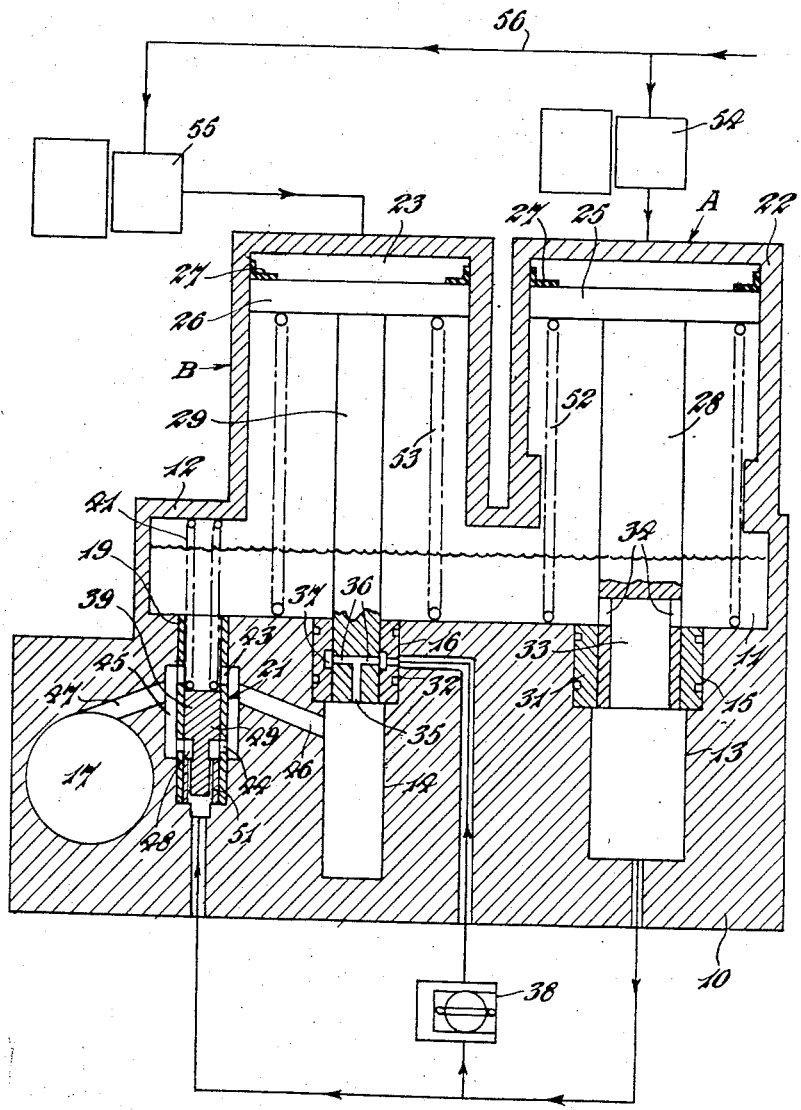
Figure 1 is a diagram showing one form of feed system according to the invention, and the air and liquid connections between the various units.

Automatic flash-butt resistance welding machines comprise a frame carrying a fixed head, a movable head slidable in the frame towards and away from the fixed head, clamping means for securing the work-pieces in the fixed and moving heads respectively, and a feed system for effecting the movement of the moving head. The welding current is supplied to the work-pieces through the clamping means.

The accompanying drawings show only the parts included in the feed system. Referring to the drawings, a solid block of metal 10, adapted to be rigidly secured to the machine frame has welded to its upper edges plates forming the sides of a reservoir 11, of which the top of the block 10 forms the base, a cover 12 being welded to the sides of the reservoir.

The block 10 is bored vertically from its upper face to provide the liquid cylinders of two air-liquid intensifiers A and B, the liquid cylinder 13 of the intensifier A being of larger diameter than the liquid cylinder 14 of the intensifier B. The cylinders 13 and 14 are closed at their lower ends, and have counterbored portions 15 and 16 at their upper ends. A horizontal bore 17 in one end of the block 10 forms a cylinder for a ram 18 connected to the moving head of the welding machine, and a third vertical bore 19 again closed at its lower end, houses a pressure operated valve 21.

The air cylinders 22 and 23 of the pressure intensifiers A and B are mounted on the reservoir cover 12, being clamped thereto by bolts or studs 24. The air cylinder 23 is shown as being of larger diameter than the air cylinder 22.

Pistons 25 and 26, provided with suitable packings 27, are slidably mounted in the air cylinders 22 and 23 respectively and plungers 28 and 29, fixed respectively to the pistons 25 and 26, depend through the reservoir 12 into the liquid cylinders 13 and 14, being guided by sleeves 31 and 32 fitted in the counterbored portions 15 and 16 of the said cylinders. The plungers 28 and 29 are a substantially fluid-tight fit in the sleeves 31 and 32 and packings are provided between the sleeves and the bores in the block. The plungers 28 and 29 are of smaller diameter than their respective cylinders 13 and 14.

The plunger 28 is shown as being of larger diameter than the plunger 29. Thus the intensifier B has a larger air piston and a smaller plunger than the intensifier A, so that a given air pressure produces a greater liquid pressure in intensifier B than in intensifier A, but it will be understood that the desired difference between the pressures produced by the two intensifiers may be obtained with pistons of equal diameter and plungers of unequal diameter, or with plungers of equal diameter and pistons of unequal diameter.

The plunger 28 has a longitudinal passage 33 extending upwardly from its lower end, and lateral ports 34 leading into the passage 33. When the plunger is fully raised, these ports are open to the reservoir 12, as shown in Figures 1 and 3. The plunger 29 has a similar longitudinal passage 36 and lateral ports 36, the ports when the plunger is fully raised, opening into an annular recess 37 in the sleeve 32.

The liquid cylinder 13 of the intensifier A is connected to a metering valve 38 (Figure 1) of any suitable type and also to the lower end of the valve bore 19. The metering valve is connected to the recess 37.

The pressure operated valve 21, which comprises a valve plunger 39 urged by a spring 41 in a downward direction, is slidable in a sleeve 42 fitted in the valve bore 19, the sleeve having formed in it two spaced rings of ports 43 and 44 opening into an enlargement 45 of the bore 19, which enlargement 45 is shown in Figure 1 as being connected by passages 46 and 47 respectively to the liquid cylinder 14 of the intensifier B, and to the ram cylinder 17. In practice, the liquid cylinder 14 may be connected directly to the ram cylinder 17, the passage 47 being omitted. The valve plunger 39 is formed with a circumferential groove 48 between its ends, the land 49 above the groove 48 being somewhat shorter than the space between the ports 43 and 44, and passages 51 having a small cross-sectional area lead from the groove 48 to the lower end of the valve plunger.

The air pistons 25 and 26 are urged upwardly by springs 52 and 53 respectively. The upper ends of the air cylinders 22 and 23 are connected to solenoid operated valves 54 and 55 respectively, which control the supply of compressed air to the cylinders from an air supply pipe 56 (Figure 1). The valve 54 is shown in section in Figure 3, the valve 55 being similar. Each of these valves comprises a body 57 the bore of which is formed with three circumferential recesses 58, 59 and 61, the upper recess 58 being connected to the air supply pipe 56, the central recess 59 being connected to the air cylinder, and the lower recess 61 to an exhaust port. A valve plunger 62 is urged downwardly by a spring 63 to the position shown, in which it cuts off the recess 58 from the recess 59, and connects the recesses 59 and 61 together. Energisation of a solenoid the armature of which is connected to the upper end of the valve plunger 62 raises the said plunger to cut off the recess 61 from the recess 59, and to connect the recesses 58 and 59 together.

As shown in Figures 3 and 4 respectively, the sleeves 31 and 32 are held in position in the counterbores 15 and 16 by plates 65 and 66 secured by bolts 67 to the top of the block, the plate 66 serving also to hold the sleeve 42 in position in the valve bore. The spring 41 of the pressure operated valve 21 takes its abutment on a member 68 supported by a pair of bolts (not shown) from the top of the block 10, and the initial position of the valve plunger 39 is adjustable by means of a screw 69 in the screw-threaded lower end of a bore 71 coaxial with the valve bore, a rod 72, fitted with a packing ring 73, being interposed between the screw 69 and the valve plunger 39. The valve plunger 39 when in engagement with the rod 72, has its upper end just below the ports 43. Upward movement of the valve plunger 39 is limited by the plate 66.

The ram 18 includes a head 74 fitting in the cylinder 17 and provided with piston rings 75, and a rod 76 which projects through one end of the cylinder 17, a fluid tight joint being provided by a diaphragm 77 of rubber, bonded to inner and outer metal rings 78 and 79 which are respectively clamped, in a fluid-tight manner, to the rod 76 and to the block 10. The rod 76 extends through the head 74 and engages, when the ram is retracted, with a closure plate 81 closing the opposite end of the cylinder 17, thus providing a stop for the ram. The ram is retracted by a spring 82 arranged between the outer side of the plate 81 and an abutment plate 83 coupled by rods 84 sliding in holes in the block 10 to a bridge plate 85 mounted on the rod 76.

Figure 6 is an electrical diagram for a welding machine having a feeding system according to the present invention, the machine being intended for performing only simple flash-butt welding without preheating.

The electric supply mains are shown at 86 and 87, the primary windings 88 of the welding transformer 89 being connected across them through two pairs of relay-controlled contacts 91 and 92 in a main contactor. Four relay coils 93, 94, 95 and 96 are connected across the mains, the circuits of the relay coils 94, 95 and 96 all including an on-off switch 97, whilst the circuit of the relay coil 93 includes two pairs of relay contacts 98 and 99. The solenoids 101, 102 which control respectively the air valves 54 and 55 of the first and second intensifiers are also connected across the mains, relay contacts 103 and 104 being included in their respective circuits. A cut-out switch 105 is included in the circuit of the relay coil 94, and a switch 106 closed by the moving head of the machine when it reaches a predetermined point on its forward stroke is included in the circuit of the relay coil 96. The main contactor contacts 91 and 92 are controlled by the relay coil 93, being closed when that coil is energised; the contacts 98 and 99 are closed when the relay coil 94 is energised; whilst the contacts 103 and 104 are closed respectively by energisation of the relay coils 95 and 96.

To operate the machine, the switch 97 is closed, thus energising the relay coils 94 and 95, the former closing the contacts 98 and 99 to energise the relay coil 93 and thus close the main contactor contacts 91 and 92, whilst the latter closes the contacts 103 to energise the solenoid 101 and so operate the air valve 54 to admit air to the air cylinder of the intensifier A, the air acting on the piston 25 to force it and the plunger 28 downwardly. During the initial movement of the plunger 28, the ports 34 move into the sleeve 31, thus cutting off the cylinder 13 from the reservoir 11, and pressure is then produced in the cylinder 13. This pressure, acting on the lower end of the valve plunger 39 of the pressure operated valve 21, lifts the said plunger so that the land thereon closes the ports 43. Liquid is forced from the cylinder 13 through the metering valve 38 into the recess 37 in the sleeve 32 of the second intensifier B, and, as the plunger 29 of that intensifier is in its upper position, passes into the cylinder 14 and so to the ram cylinder 17, the cylinders 14 and 17 being cut off from the reservoir by the lifting of the valve plunger 39. The ram 18 is thus moved forward to produce flashing between the work-pieces, and flashing continues until the forward movement causes closing of the switch 106. The closing of this switch energises the relay coil 96 to close the contacts 104 and thus energise the solenoid 102, which operates the air valve 55 of the intensifier B to admit compressed air to the air cylinder 23 and force down the piston 26 and plunger 29. The initital downward movement of the plunger 29 brings the ports 36 out of register with the recess 37, thus cutting off the liquid cylinder 13 of the intensifier A from the ram cylinder 17, and liquid is forced from the cylinder 14 of the intensifier B into the ram cylinder. As there is no restriction between the cylinder 14 and the ram cylinder the ram is advanced rapidly, and the pressure acting on the ram is increased due to the different ratios between the areas of the pistons and plungers of the intensifiers. The moving head is thus advanced rapidly and under high pressure to forge the work-pieces together, the cut out switch 105 being opened immediately after the switch 106 has closed, to de-energise the relay coil 94 and so cut off the welding current.

When the weld is completed, the switch 97 is opened, thus de-energizing the solenoids of both air valves 54 and 55, and the pistons and plungers of both intensifiers A and B are moved upwardly by the springs 52 and 53. The lifting of the plunger 28 allows the valve plunger 39 to move downwardly, thus connecting the ram cylinder 17 and the liquid cylinder 14 of the intensifier B to the reservoir due to the opening of the ports 43, and opening a path for liquid between the reservoir 11 and the liquid cylinder 13 of the intensifier A through the ports 43, recess 45, ports 44, groove 48 and passages 51. Liquid can thus flow into the cylinder 13 as the plunger 28 rises, and the formation of a vacuum in that cylinder is avoided. The passages 51 offer sufficient restriction to the flow of liquid to ensure that the valve plunger is moved upwardly when the intensifier A is operated.

To effect pre-heating of the work-pieces before the actual welding operation, the moving head is moved to and fro, bringing the work-pieces intermittently into contact so that the current flows between them for short periods. The to-and-fro movement may be controlled manually or automatically, the forward movements being effected by the intensifier A, and the return movements by the ram return spring 82.

For manually controlled pre-heating, the circuit of the solenoid controlling the air valve 54 of the intensifier A is closed and opened by means of a manually controlled switch whilst the main contactor is closed, the opening of the manually controlled switch causing the air supply to the intensifier A to be cut off and the resulting upward movement of the plunger 28 allowing the valve plunger 39 to move downwardly thus allowing liquid to return from the ram cylinder 17 to the reservoir, so that the ram and the moving head move back. When the required degree of heating has been effected, which is indicated by the commencement of flashing, the manually controlled switch is left in the closed position, and the parts are flashed and forged as above described, the butting switch 106 coming into operation to produce operation of the intensifier B at the appropriate time. The valve plunger 39 moves rapidly upwardly when the air valve 54 is operated to reconnect the air cylinder 22 to the supply, and thus checks the backward movement of the ram and movable head by closing the connection between the ram cylinder and the reservoir, although the building up of pressure in the ram cylinder is retarded by the metering valve. The rate of backward movement of the ram may be controlled by adjusting the screw 69 so that the land 49 on the valve plunger 39 covers the ports 43 to a greater or less extent when the plunger is in engagement with the rod 72.

To provide automatic control of preheating the opening and closing of the relay circuit controlling the solenoid of the air valve 54 may be controlled by a timing device in combination with a voltage sensitive relay controlled by the changes in voltage due to the engagement and dis-engagement of the work-pieces, in the known manner, the timer being cut out when flashing commences by a known device responsive to the high frequency current produced when flashing commences, so that once flashing has started the air valve 54 remains closed and flashing and forging takes place as already described.

The restricted passages 51 in the valve plunger 39 may be replaced by a single passage of larger cross-sectional area, controlled by a downwardly opening non-return valve.

We claim:

1. In an automatic flash-butt resistance welding machine comprising a fixed head, a moving head, and liquid pressure means to move the moving head towards the fixed head to effect flashing and butting of work-pieces mounted on said fixed and moving heads respectively, the improved liquid pressure means which include first and second liquid pressure producing units providing respectively lower and higher liquid pressures, a metering valve controlling the rate of flow of liquid from the first liquid pressure producing unit, operator controlled means to control the first pressure producing unit, and means actuated by the moving head to control the second pressure producing unit, the first pressure producing unit being rendered operative by the operator controlled means to move the moving head during flashing of the work pieces and the means actuated by the moving head being actuated at the termination of the flashing period to bring the second pressure producing means into operation and apply pressure generated thereby to the moving head to effect butting of the workpieces.

2. In an automatic flash-butt resistance welding machine comprising a fixed head, a moving head, and liquid pressure means to move the moving head towards the fixed head to effect flashing and butting of work-pieces mounted on said fixed and moving heads respectively, the improved liquid pressure means which include first and second liquid pressure producing units providing respectively lower and higher liquid pressures, a ram cylinder, a ram slidable in said cylinder and operatively connected to the moving head, a liquid reservoir, liquid pressure operated valve means controlling a connection between the ram cylinder and the reservoir, a metering valve to control the rate of flow of liquid from the first liquid pressure producing unit, operator controlled means to control the first pressure producing unit, means actuated by the moving head to control the second liquid pressure producing unit, and conduit means connecting the first liquid pressure producing unit to operate the valve means, the first liquid pressure producing unit being rendered operative by the operator controlled means to close the valve means and supply liquid to the ram cylinder to move the moving head during flashing of the work pieces, and the means actuated by the moving head being actuated at the termination of the flashing period to bring the second pressure producing means into operation and supply liquid pressure generated thereby to the ram cylinder to effect butting of the work pieces.

3. In an automatic flash-butt resistance welding machine comprising fixed head, a moving head, and liquid pressure means to move the moving head towards the fixed head to effect flashing and butting of work-pieces mounted on said fixed and moving heads respectively, the improved liquid pressure means which include first and second liquid pressure producing units each comprising a liquid cylinder, an air cylinder, and differential plunger means having a larger area exposed to air pressure in the air cylinder and a smaller area acting on liquid in the liquid cylinder, the difference between the larger and smaller areas of the plunger means in the first liquid pressure producing unit being smaller than the difference between the larger and smaller areas of the plunger means in the second liquid pressure producing unit, air pressure supply means connected to both air cylinders, a first air valve controlling the supply of air to the air cylinder of the first liquid pressure producing unit, a second air valve controlling the supply of air to the air cylinder of said second liquid pressure producing unit, a ram cylinder, a ram slidable in said ram cylinder and operatively connected to the moving head, a liquid reservoir, liquid pressure operated valve means controlling a connection between the ram cylinder and the reservoir, operator operated means to control the first air valve, means operated by the moving head to control the second air valve, and conduit means connecting the liquid cylinder of the first liquid pressure producing unit to operate the valve means, operation of the operator operated means admitting air to the air cylinder of the first liquid pressure producing unit to create liquid pressure therein to close the valve means and move the moving head during flashing of the workpieces, and the means operated by the moving head being actuated at the termination of the flashing period to supply air to the air cylinder of the second liquid pressure producing unit and operate the said unit to apply pressure to the ram and effect butting of the workpieces.

4. In an automatic flash-butt resistance welding machine comprising a fixed head, a moving head, and liquid pressure means to move the moving head towards the fixed head to effect flashing and butting of workpieces mounted on said fixed and moving heads respectively, the improved liquid pressure means which include first and second liquid pressure producing units each comprising a liquid cylinder, an air cylinder, and differential plunger means having a larger area exposed to air pressure in the air cylinder and a smaller area acting on liquid in the liquid cylinder, the difference between the larger and smaller areas of the plunger means in the first liquid pressure producing unit being less than the difference between the larger and smaller areas of the plunger means in the second liquid pressure producing unit, air pressure supply means connected to both air cylinders, a first air valve controlling the supply of air to the air cylinder of the first liquid pressure producing unit, a second air valve controlling the supply of air to the air cylinder of the second liquid pressure producing unit, a ram cylinder, a ram slidable in said ram cylinder and operatively connected to the moving head, a liquid reservoir, first conduit means connecting the liquid cylinder of said second liquid pressure producing unit and said ram cylinder to each other and to the liquid reservoir, liquid pressure operated valve means in said conduit means to isolate said liquid cylinder and said ram cylinder from the liquid reservoir, passage means obturated by initial movement of the plunger means in the first liquid pressure producing unit to connect the liquid cylinder of said unit to the liquid reservoir, second conduit means leading from the liquid cylinder of said first liquid pressure producing unit to operate said valve means, third conduit means leading from the liquid cylinder of said first liquid pressure producing unit to the liquid cylinder of the second liquid pressure producing unit, a metering valve in said third conduit means, said third conduit means being closed by initial movement of the plunger means in said second fluid pressure producing unit, operator operated means to control the first air valve, means operated by the moving head to control the second air valve, operation of the operator operated means admitting air to the air cylinder of the first liquid pressure producing unit to create liquid pressure in the said unit to close the valve means and move the moving head during flashing of the workpieces, and the means operated by the moving head being actuated at the termination of the flashing period to supply air to the air cylinder of the second liquid pressure producing unit and operate the said unit to isolate the first liquid pressure producing unit from the ram cylinder and apply pressure to the ram to effect butting of the workpieces.

5. In an automatic flash butt resistance welding machine comprising a fixed head, a moving head, and liquid pressure means to move the moving head towards the fixed head to effect flashing and butting of work pieces mounted on said fixed and moving heads respectively, the improved liquid pressure means which include a cylinder block formed with first and second vertical cylinder bores and a horizontal cylinder bore the vertical cylinder bores being closed at their lower ends, walls extending upwardly from said cylinder block to define a liquid reservoir into which said vertical cylinder bores open, two vertical air cylinders above said reservoir and coaxial respectively with said first and second vertical cylinder bores, a first differential-area plunger having its smaller area end slidable in the first vertical cylinder bore and its larger area end slidable in the air cylinder co-axial therewith, a second differential-area plunger having its smaller area end slidable in the second vertical cylinder bore and its larger area end slidable in the air cylinder co-axial therewith, the difference between the areas of the first differential-area plunger being smaller than the difference between the areas of the second differential-area plunger, closure means closing one end of said horizontal cylinder bore, a ram slidable in said horizontal cylinder bore, means connecting said ram to the moving head of the welding machine, a third vertical bore in said cylinder block opening into said liquid reservoir, a circumferential groove in the wall of said bore, passage means connecting said groove respectively to the ram cylinder and to the second vertical cylinder bore, a valve plunger in said third vertical bore, plunger-controlled means connecting said first vertical cylinder bore to the reservoir, conduit means connecting said first vertical cylinder bore to the second vertical cylinder bore, said conduit means being obturated by downward movement of the second differential-area plunger, a metering valve in said conduit means, second conduit means connecting said first vertical cylinder bore to the lower end of the third vertical bore, air pressure supply means, manual control means to connect said air pressure supply means to the air cylinder of the first differential-area plunger and control means actuated by the moving head to connect said air pressure supply means to the air cylinder of the second differential-area plunger at a predetermined position of the moving head, the admission of air to the first air cylinder moving the first differential-area plunger downwardly to close the connection of the first vertical cylinder bore with the reservoir and apply liquid pressure firstly to the valve plunger in the third vertical bore to lift said plunger and thereby cut off the groove around said bore from the reservoir and secondly to displace said ram and moving head until the latter operates the control means to admit air to the second air cylinder and move the second differential-area plunger downwardly to cut off the first vertical cylinder bore from the ram cylinder and apply liquid pressure from said second vertical cylinder bore to the ram cylinder.

6. In an automatic flash-butt resistance welding machine comprising a fixed head, a moving head, and liquid pressure means to move the moving head towards the fixed head to effect flashing and butting of work-pieces mounted on said fixed and moving heads respectively, the improved liquid pressure means set forth in claim 5 and a rod connecting the ram to the moving head, a flexible diaphragm closing the end of the ram cylinder through which said rod projects, and means securing the inner and outer edges of the diaphragm respectively in a fluid-tight manner to the rod and to the cylinder.

7. In an automatic flash-butt resistance welding machine comprising a fixed head, a moving head, and liquid pressure means to move the moving head towards the fixed head to effect flashing and butting of work-pieces mounted on said fixed and moving heads respectively, the improved liquid pressure means set forth in claim 5 wherein the manual control means comprises a first valve interposed between said air pressure supply means and the air cylinder of said first differential plunger, a solenoid operatively connected to said first valve, and a manual switch to control said solenoid, and said control means actuated by the moving head includes a second valve interposed between the air pressure supply means and the air cylinder of the second differential plunger, a solenoid operatively connected to said second valve, and a switch operated by said moving head to control said last mentioned solenoid.

References Cited in the file of this patent

UNITED STATES PATENTS

| Number | Name | Date |
| --- | --- | --- |
| 2,187,452 | Gordon | Jan. 16, 1940 |
| 2,298,051 | Gordon | Oct. 6, 1942 |
| 2,331,537 | Clark | Oct. 12, 1943 |

FOREIGN PATENTS

| Number | Country | Date |
| --- | --- | --- |
| 812,962 | France | Feb. 5, 1937 |